(12) United States Patent
Hahn

(10) Patent No.: US 7,584,270 B2
(45) Date of Patent: Sep. 1, 2009

(54) LOG ON PERSONAL COMPUTER

(76) Inventor: Victor Hahn, 3464 Colonial Ave., Roanoke, VA (US) 24018

(*) Notice: Subject to any disclaimer, the term of this patent is extended or adjusted under 35 U.S.C. 154(b) by 301 days.

(21) Appl. No.: 10/319,596

(22) Filed: Dec. 16, 2002

(65) Prior Publication Data

US 2003/0140171 A1 Jul. 24, 2003

Related U.S. Application Data

(63) Continuation of application No. 08/954,213, filed on Oct. 20, 1997, now abandoned.

(51) Int. Cl.
*G06F 15/177* (2006.01)
(52) U.S. Cl. .................... 709/220; 709/224
(58) Field of Classification Search ............... 709/203, 709/253, 224, 236, 229; 718/1; 717/141; 358/400
See application file for complete search history.

(56) References Cited

U.S. PATENT DOCUMENTS

| | | | | |
|---|---|---|---|---|
| 3,891,974 A | * | 6/1975 | Coulter et al. ................ 703/23 |
| 3,909,800 A | * | 9/1975 | Recks et al. ................ 710/5 |
| 4,377,852 A | * | 3/1983 | Thompson ................ 710/47 |
| 4,486,827 A | * | 12/1984 | Shima et al. ................ 710/261 |
| 4,527,237 A | * | 7/1985 | Frieder et al. ................ 709/253 |
| 4,611,277 A | | 9/1986 | Kemppainen et al. ........ 364/200 |
| 4,779,188 A | * | 10/1988 | Gum et al. ................ 718/1 |
| 4,958,347 A | * | 9/1990 | White et al. ................ 714/43 |
| 4,993,027 A | * | 2/1991 | McGraw et al. ................ 714/29 |
| 5,036,484 A | | 7/1991 | McCoy et al. ................ 703/23 |
| 5,163,833 A | | 11/1992 | Olsen et al. ................ 439/61 |
| 5,274,810 A | | 12/1993 | Meldrum ................ 395/700 |
| 5,287,460 A | * | 2/1994 | Olsen et al. ................ 710/63 |
| 5,299,313 A | | 3/1994 | Petersen et al. ............ 709/200 |
| 5,321,828 A | * | 6/1994 | Phillips et al. ................ 703/28 |
| 5,325,361 A | | 6/1994 | Lederer et al. ............ 370/94.1 |
| 5,388,060 A | | 2/1995 | Adams, Jr. et al. ............ 703/27 |
| 5,388,215 A | * | 2/1995 | Baker et al. ................ 709/229 |
| 5,410,681 A | * | 4/1995 | Jessen et al. ................ 703/27 |
| 5,440,699 A | | 8/1995 | Farrand et al. ............ 395/155 |
| 5,442,791 A | | 8/1995 | Wrabetz et al. | |
| 5,446,868 A | | 8/1995 | Gardea, II et al. ........... 395/500 |
| 5,452,460 A | | 9/1995 | Distelberg et al. .......... 395/700 |
| 5,455,948 A | | 10/1995 | Poole et al. ................ 395/650 |

(Continued)

OTHER PUBLICATIONS

A successful example of mainframe software development on a personal computing system Lezniak, T.W.; Aerospace and Electronics Conference, 1988. NAECON 1988., Proceedings of the IEEE 1988 National May 23-27, 1988 pp. 626-635 vol. 2.*

(Continued)

*Primary Examiner*—Thong H Vu

(57) ABSTRACT

A computer network having a mainframe host computer capable of being selectively connected to a multiplicity of personal computers (PCs) such that the unlimited capabilities of CPU, memory, and software programs of the mainframe host computer can be accessed by the PCs, thus enhancing its capabilities. In particular, the mainframe host computer has an interface for interrogating the name, address and operating system of the PCs, and an emulation program for synchronizing the machine language of the PCs connected therewith. Additionally, the PCs provide input to the interface program to select a particular task, which is executed by the mainframe host computer using the host machine language and the results are then translated into the corresponding machine language of the PCs and relayed back.

6 Claims, 2 Drawing Sheets

U.S. PATENT DOCUMENTS

| | | | | |
|---|---|---|---|---|
| 5,483,647 | A | | 1/1996 | Yu et al. ............... 395/500 |
| 5,490,134 | A | * | 2/1996 | Fernandes et al. ........... 370/466 |
| 5,608,865 | A | | 3/1997 | Midgely et al. ............ 395/180 |
| 5,630,102 | A | | 5/1997 | Johnson et al. .............. 703/28 |
| 5,664,098 | A | | 9/1997 | Bianchi et al. ............. 713/200 |
| 5,673,418 | A | | 9/1997 | Stonier et al. ............... 395/500 |
| 5,675,771 | A | | 10/1997 | Curley et al. ................ 395/500 |
| 5,678,032 | A | | 10/1997 | Woods et al. ............... 395/500 |
| 5,734,865 | A | | 3/1998 | Yu ............................. 395/500 |
| 5,742,802 | A | * | 4/1998 | Harter et al. ................ 712/227 |
| 5,758,341 | A | | 5/1998 | Voss ............................ 707/10 |
| 5,761,662 | A | | 6/1998 | Dasan ......................... 707/10 |
| 5,767,851 | A | | 6/1998 | Yee et al. .................... 345/346 |
| 5,784,439 | A | | 7/1998 | Nagelmann et al. ...... 379/91.01 |
| 5,808,558 | A | * | 9/1998 | Meek et al. ........... 340/870.01 |
| 5,812,127 | A | | 9/1998 | Janay et al. ................. 346/333 |
| 5,812,864 | A | | 9/1998 | McCoy et al. .............. 395/800 |
| 5,822,563 | A | | 10/1998 | Sitbon et al. ................ 395/500 |
| 5,838,948 | A | * | 11/1998 | Bunza ......................... 703/27 |
| 5,841,670 | A | | 11/1998 | Swoboda .................... 364/578 |
| 5,896,522 | A | | 4/1999 | Ward et al. ................. 395/500 |
| 5,903,719 | A | | 5/1999 | Yamamoto ............ 395/183.14 |
| 5,909,569 | A | | 6/1999 | Housel et al. ............... 395/500 |
| 5,920,846 | A | * | 7/1999 | Storch et al. ................... 705/7 |
| 5,923,850 | A | * | 7/1999 | Barroux ...................... 709/224 |
| 5,926,636 | A | | 7/1999 | Lam et al. ................... 709/171 |
| 5,931,913 | A | | 8/1999 | Meriwether et al. ......... 709/227 |
| 5,961,586 | A | | 10/1999 | Pedersen .................... 709/201 |
| 5,966,515 | A | * | 10/1999 | Alferness ..................... 703/21 |
| 5,974,452 | A | | 10/1999 | Karapetkov et al. ......... 709/218 |
| 5,983,369 | A | | 11/1999 | Bakoglu et al. ............... 714/46 |
| 6,002,864 | A | * | 12/1999 | Heyman ...................... 703/23 |
| 6,006,022 | A | * | 12/1999 | Rhim et al. .................... 716/1 |
| 6,006,278 | A | | 12/1999 | Cottrill ...................... 709/300 |
| 6,009,256 | A | * | 12/1999 | Tseng et al. .................. 703/13 |
| 6,026,238 | A | * | 2/2000 | Bond et al. ................. 717/141 |
| 6,031,988 | A | * | 2/2000 | Nakashima .................. 703/26 |
| 6,044,408 | A | * | 3/2000 | Engstrom et al. ........... 719/328 |
| 6,108,420 | A | | 8/2000 | Larose et al. .................. 380/4 |
| 6,147,773 | A | * | 11/2000 | Taylor et al. ................ 358/400 |
| 6,212,191 | B1 | | 4/2001 | Alexander et al. .......... 370/401 |
| 6,377,998 | B2 | * | 4/2002 | Noll et al. ................... 709/236 |
| 6,385,567 | B1 | * | 5/2002 | Lew et al. .................... 703/27 |
| 6,622,116 | B2 | * | 9/2003 | Skinner et al. .............. 702/183 |

OTHER PUBLICATIONS

Client-server computing architecture: an efficient paradigm for project management; Hura, G.S.; Engineering Management Conference, 1995. 'Global Engineering Management: Emerging Trends in the Asia Pacific'., Proceedings of 1995 IEEE Annual International Jun. 25-28, 1995 pp. 146-152.*

Managing PC networks; Heilbronner, S.; Wies, R.; Communications Magazine, IEEE vol. 35, Issue 10, Oct. 1997 pp. 112-117.*

Distributed Processing Involving Personal Computers and Mainframe Hosts; Parr, F.; Auerbach, J.; Goldstein, B.; Selected Areas in Communications, IEEE Journal on vol. 3, Issue 3, May 1985 pp. 479-489.*

Office Action from the European Patent Office dated Dec. 18, 2007 for corresponding Application 99 914 914.9—1243.

Notification of Reasons for Refusal for Office Action dated Jan. 15, 2008 from the Japanese Patent Office for Patent Application No. 2000-605908.

* cited by examiner

LOG ON PERSONAL COMPUTER

This application is a Continuation of prior application Ser. No. 08/954,213 filed Oct. 20,1997 now abandoned.

BACKGROUND OF THE INVENTION

This invention relates in general, to the communication between computers, more specifically, to the capabilities and operation of personal computers (PC) (PCs) and its expansion when PCs are networked with a mainframe, host, and/or server computer; still more specifically, when a PC (or PCs) access the mainframe, host and/or server computer's greater and more flexible capabilities or unlimited capabilities of CPU speed, computing power, RAM, ROM memory, memory, hardware, software, and attributes, therefore, increasing the limited or fixed capabilities of the PC (or PCs). In particular, the case or instances where the PC (or PCs) is used merely as a "terminal" for the mainframe, host, and/or server computer. Still more particular, the case to establish communication between computers in general, (as described and disclosed in the present invention), "irregardless" of their relative capabilities (and/or sizes), this case to include PC to PC (direct) communication.

Problem

Ownership and operation of PCs has enjoyed a phenomenal growth during the recent years. The capabilities of each generation of new PCs has increased based on better and faster central processing units (CPUs), such as the Intel 320, 386, 486, and then the Pentium series, as well as to an increase in memory capacity (i.e., hard drives, RAM, ROM, etc). Apple computers have also progressed from the llib through the McIntosh. There are also numerous companies producing clones under their own labels. With the explosion of the number of PCs in use, an even greater explosion or progress or evolution of uses, otherwise known as software, software programs, and/or applications, is taking place, as well an advance in network architectures and in the Internet itself. As the capabilities and speed of the CPUs increase, the amount of computing power, or speed, available or required to run the new and/or larger software increases, as well as the amount or capacity of ROM and RAM memory, and memory. This progression or evolution has allowed the programmers to develop more sophisticated, expensive, and larger software (AUTO CAD was around US $4,000.00 in 1997) that requires more memory and faster CPU speeds to operate, that can accomplish more difficult and complex tasks. The availability and applications of software have greatly increased over the recent years.

However, the ever increasing requirements of the new software quickly outpaces the capability of the old PC hardware. In order to run the new software, the PC owner must upgrade the old PC or invest in a more capable PC. It has been stated that the consumer usually upgrades every 3 to 5 years.

Most PCs are purchased by the consumer as an integral whole or name brand complete computer with fixed motherboard, CPU, RAM, and ROM memory elements or components, and some basic software already programmed into the computer, i.e., with fixed or limited capabilities. The normal consumer probably does not know, understand, or care, what is inside the computer case. The more "computer literate" consumers may upgrade the capabilities of their computer by adding after-market components, such as faster CPUs and increased memory until the motherboard may reach its designed limits and/or capabilities. However, software that requires more capability than the PC hardware can deliver cannot be successfully operated on the PC computer. Therefore, in the normal course of events, due to the fixed/limited capabilities, the consumer needs or is required to discard the old, less capable, computer about every 3 to 5 years, and purchases the newer model with more but still limited capabilities, so that the more sophisticated, expensive, and larger software and/or applications that require more capabilities, can be run. Certainly, this expensive solution economically drives the computer industry.

Art Background

It is known that the standard memory of a hard drive of a PC in 1997 was about 1.5 giga bytes, about 3 times more than 2 years earlier, and that the standard CPU clock speed, was about 133 MHz (Intel 486), about 3 times faster than 2 years earlier (slow). Clock speed is just equally spaced signals to cause an operation(s)). The motherboard, the main board where all components and connections are attached or inserted, is about 9 by 11 inches (2009), slightly larger than in 1997, and still comes with one square slot for the CPU, and with 4 empty slots for 4 RAM memory (or main memory) "chips", each chip about 32 Mbytes (1997), to be filled according user's needs and cost. (NOTE that not enough RAM will easily compromise CPU and PC capabilities and performance). Buses (cables/connectors) that transfer data and signals for I/O between components, mainly into the CPU, can also easily compromise CPU and PC capabilities, if the bus speed is too slow. It is said that Intel has spent 20-plus years focusing on clock speed, while the I/O architecture of the PC has made relatively minor advances; therefore, most PC's, including the CPU, are, (presently in the market), easily bottlenecked by I/O limitations of data transfer, further diminishing the capabilities and performance of the CPU and the PC. In conclusion, the PC has very "fixed or limited" capabilities due to (1) its still very small, simple and limited hardware (motherboard, CPU, RAM, hard drive, buses, etc.) and software architectures, and (2) NOT balanced hardware and software architectures for fast I/O capabilities and performance.

Regarding mainframes, it is known nowadays (2009), that the smallest IBM mainframe/server, the System z9 series, runs at about 26 MIPS, and that their largest mainframe/server, the System z10 series, runs at about 31,000 MIPS; that is about 1,200 times faster computing power/capabilities within the mainframe and servers range; and with their latest Parallel Sysplex technology, joining up to 32 z10's, as fast as 981,000 MIPS; (i.e., about 38,000 more computing power that the 26 MIPS of the z9 Ref: Wikipedia), (MIPS is a much better indicator of the computing power and speed of a computer). They have very complex CPU architectures (like multi-CPU's, CPU's with quad-core technology, etc.), hardware architectures (fast I/O devices/methods for fast data traffic, unlimited memory, etc.), and software architectures (data formatted in a special way for fast data traffic, powerful software, etc.). And by balancing I/O devices/capabilities with MIPS, with multi-CPU's, with main storage, and by adding the 3 sophisticated architectures, then, their computing power, capabilities, attributes, and performance, may increase exponentially. This demonstrates the wide range of fast CPU speeds, computing power, flexibility, capabilities, and attributes, available to mainframes, to large or larger computers, and/or to servers, in general. Some mainframes and/or servers, (if not all), are capable to handle over 250,000 queries simultaneously. The acquisition price of the z9 starts at about $100,000 (in 2006), to millions for the model 2094-

S54 and z10. An average PC costs about $500 to $700 (2009). Cost is certainly associated with capabilities and performance of a given computer. There is also the minicomputer that fills the gab between the PC and the mainframe, with their own range of faster CPU speeds, capabilities, and attributes. The minicomputer, the mainframe, and the servers fill the wide spectrum of computers sizes between the PC and the supercomputers, all of them most likely connected to the internet network. In conclusion, the capabilities and attributes of a PC are very or "extremely" limited as compared to (or as "if" when networked to) a larger one, more specifically, with a mainframe, host, and/or server computer.

SUMMARY OF THE INVENTION

In view of the foregoing, it is therefore an object of this invention to replace or expand or connect the fixed or limited capabilities and attributes of a PC with greater and more flexible capabilities and attributes.

It is an object of this invention to reduce the requirement or need to upgrade a PC or to purchase a new PC in order to get or by getting the benefits of a single program or programs, of a sophisticated or expensive program(s), or of a wide or unlimited number of programs, as well as the benefits of fast or unlimited CPU speed, of memory, and of capabilities or unlimited capabilities, and attributes, available to larger or more capable computers.

It is an object of this invention to provide hardware and method whereby a PC operator with a need for a program or programs, or a complex program(s) or larger program or programs, beyond the fixed or limited capabilities of the PC or the already loaded or quite loaded software capacity, may temporarily access (log on) a more capable host or mainframe computer and/or server, and work or operate the program or programs on the more capable mainframe, host and/or server computer using the PC and a modem and/or present conventional communication lines and methods between or connecting computers and/or networks, freeing memory space, software, CPU speed, and hardware capabilities.

It is an object of this invention to expand or connect the limited or fixed capabilities of the PC by accessing (log-on) a host or main frame computer and/or server, in order to obtain the greater or unlimited capabilities of CPU processing speed, storage or memory, software programs, and mainframe, host, and/or server attributes.

It is another object of this invention to establish a temporary network, in the nature of a client/server format or architecture, in which an older or less capable PC may be or is operatively connected to a more capable host or main frame computer and/or server, and to their attributes.

It is yet another object of this invention to program the host or main frame and/or server with a wide or unlimited selection of software packages and operating systems compatible (as much as possible, and/or according to present methods) with conventional PCs. The host or main frame and/or server may include an emulation-like processing capability as presently found on conventional communication methods linking computers and/or networks for translating PC language into host or main frame and/or server language and vice versa whereby the input and the output would be in PC language but the manipulation of the data would be in the host or main frame language.

It is still another object of this invention to provide the host or main frame and/or server with a PC interface as presently found on communication methods linking computers and/or networks, which interrogates and stores information or data concerning the location and possibly the capabilities of the PC. The PC interface operates and may or may not determine the specifics of each individual PC logging on regarding possibly the CPU speed, RAM, ROM and operating system but not necessarily. The interface determines the host or main frame and/or server I/O necessary to communicate with the PC. The interface accepts the requested program, possibly determines the amount of memory necessary to complete the task/result including the amount of host or main frame and/or server memory required until the results or data are downloaded to the PC, or saved, stored, or archived in the PC interface or in the mainframe or host and/or server, the host or main frame and/or server computing time, the total transaction time, and the fee, if any. Fees for accessing the mainframe or host and/or server can be done by (1) according to the particular type of program or programs selected and/or used, (2) by the time logged-on, (3) by CPU time used, (4) by monthly use, (5) and by present conventional methods.

While the capabilities of the PC and the host or mainframe and/or server computer as described above are in terms of the less capable PC and the more capable host or main frame and/or server, it is also an object and/or another embodiment of this invention to establish communication between the PC and mainframe or host and/or server irregardless of their relative capabilities as described and disclosed in the present invention. In addition, the invention is not limited to hardware deficiencies or to their relative capabilities, but to lack of programming, and in another embodiment of the invention, to lack or need to establish communication between computers in general, "irregardless" of their relative capabilities and/or sizes as well, as described and disclosed in this invention, this case to include PC to PC (direct) communication.

DESCRIPTION OF THE PREFERRED EMBODIMENT

Figure 1:
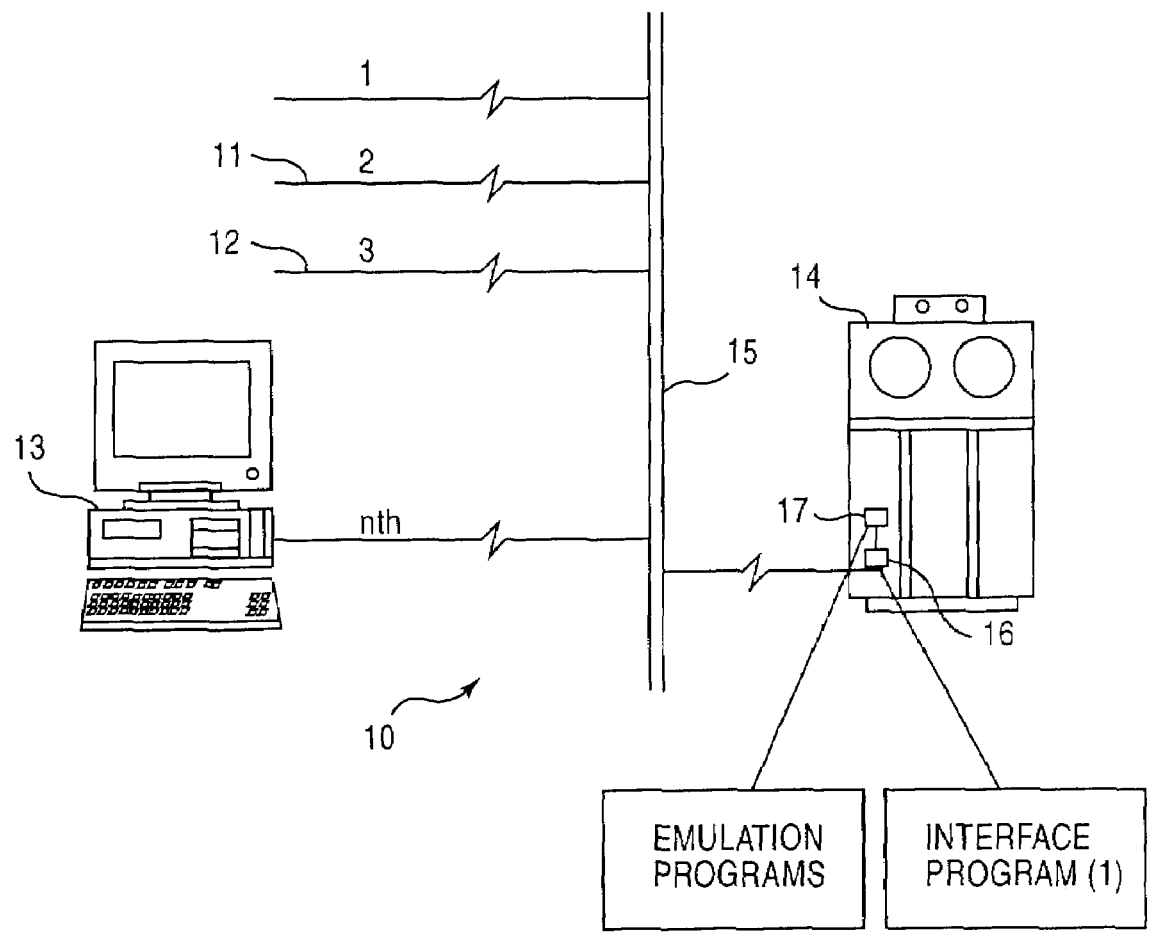
FIG. 1 is an illustration of the overall system.

In FIG. 1, the operating system 10 is shown with several PCs 11, 12, 13 logged on to the host or main frame and/or server computer 14. The particular data link between the PCs and the main frame or host and/or server may be by way of a modem (not shown) and/or by present communication methods linking computers and/or networks in a wide area network (WAN), where the main frame or host and/or server may serve PCs in a wide area. This construction or network architecture would allow PC owners or operators to log on to the system using commercial lines and/or present communication methods linking computers and/or networks. Of course, the system could be hard wired according to present method linking computers and/or networks. In FIG. 1 the connection of the main frame or host and/or server computer 14 to the PCs is illustrated by a large wide area network (WAN) 15.

The modem (not shown) and/or present communication methods linking computers and/or networks, connects the PC with the PC interface 16. The PC interface 16 is programmed to interrogate the PC electronically or by menu to possibly determine the capability of the PC. Based on the interrogation, but not necessarily, the PC interface 16 offers a wide/ample selection of programs and applications, (by menu), that are compatible, as much as possible, between the particular PC and the host or mainframe and/or server. For example, the extremes of the available programs for selection could range from those instances in which the PC requires or requests only the use of software with possibly no additional hardware capability, through those instances where the PC is used merely as a terminal for the host or main frame and/or server, this would allow the PC owner or operator (or PCs) to freely operate the mainframe or host and/or server, (as "if" the mainframe or host and/or server was its own personal computer at his location), therefore, enhancing the capabilities and attributes of the PC (or PCs) in the network; this to include performance, efficiency, and computing power.

In instances which may or may not require the computing power of a much greater magnitude than the PC, and as well as in normal operation and/or according to present communication methods linking computers and/or networks, the PC interface 16 directs the PC I/O to the host or main frame and/or server emulation port/program 17. The emulation program, in effect, makes the PC perform as a terminal to the host or main frame and/or server. The emulation program allows the PC user to access the main frame or host and/or server using the PC language and receive the results in the PC language. The emulation program translates the PC instructions or input into main frame language and translates the main frame results into PC language for distribution to the multiple users in the network, therefore, enhancing the capabilities, performance, and attributes of the PC.

Figure 2:
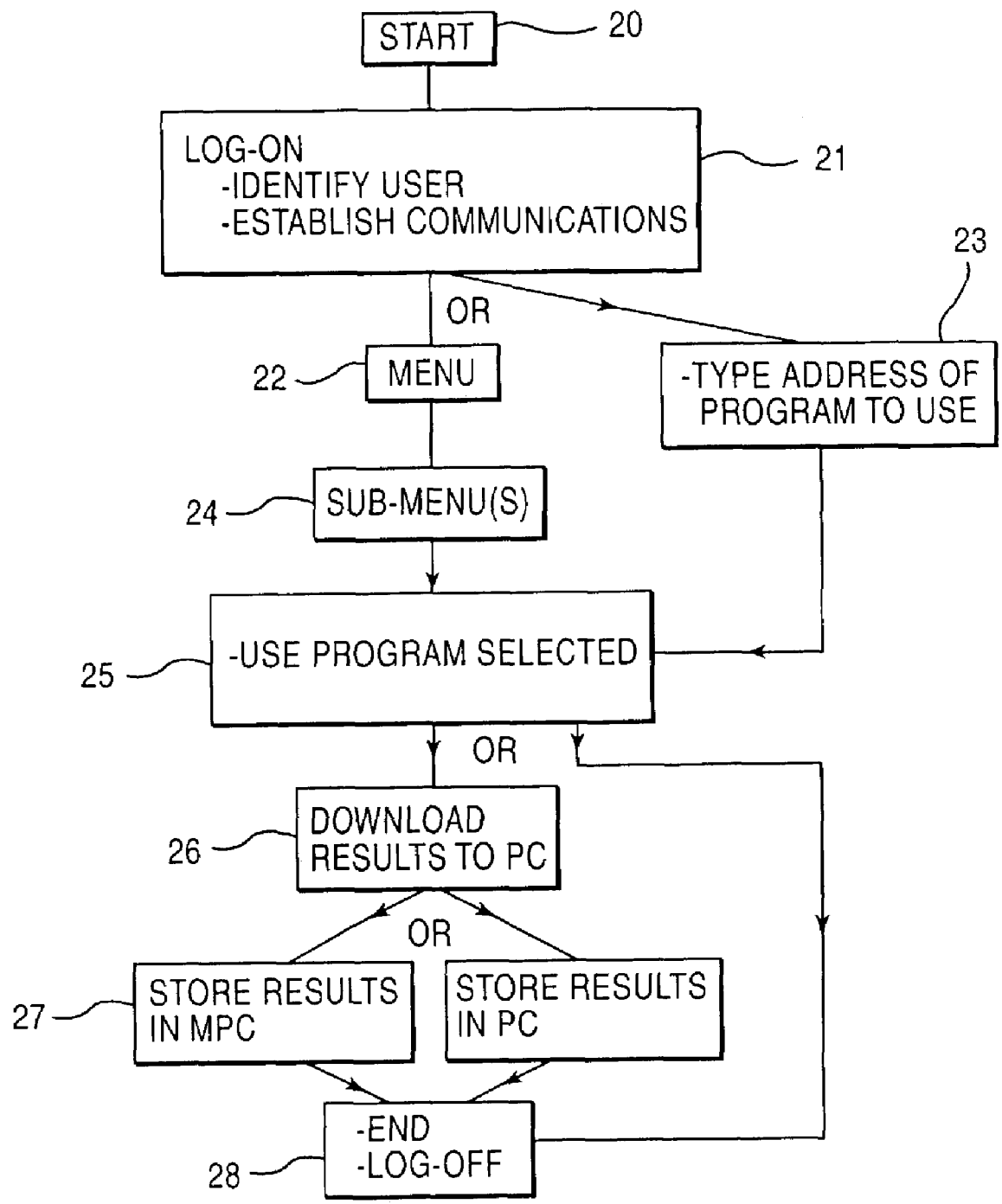
FIG. 2 is a flow chart illustrating operation of the system
Figure 1:
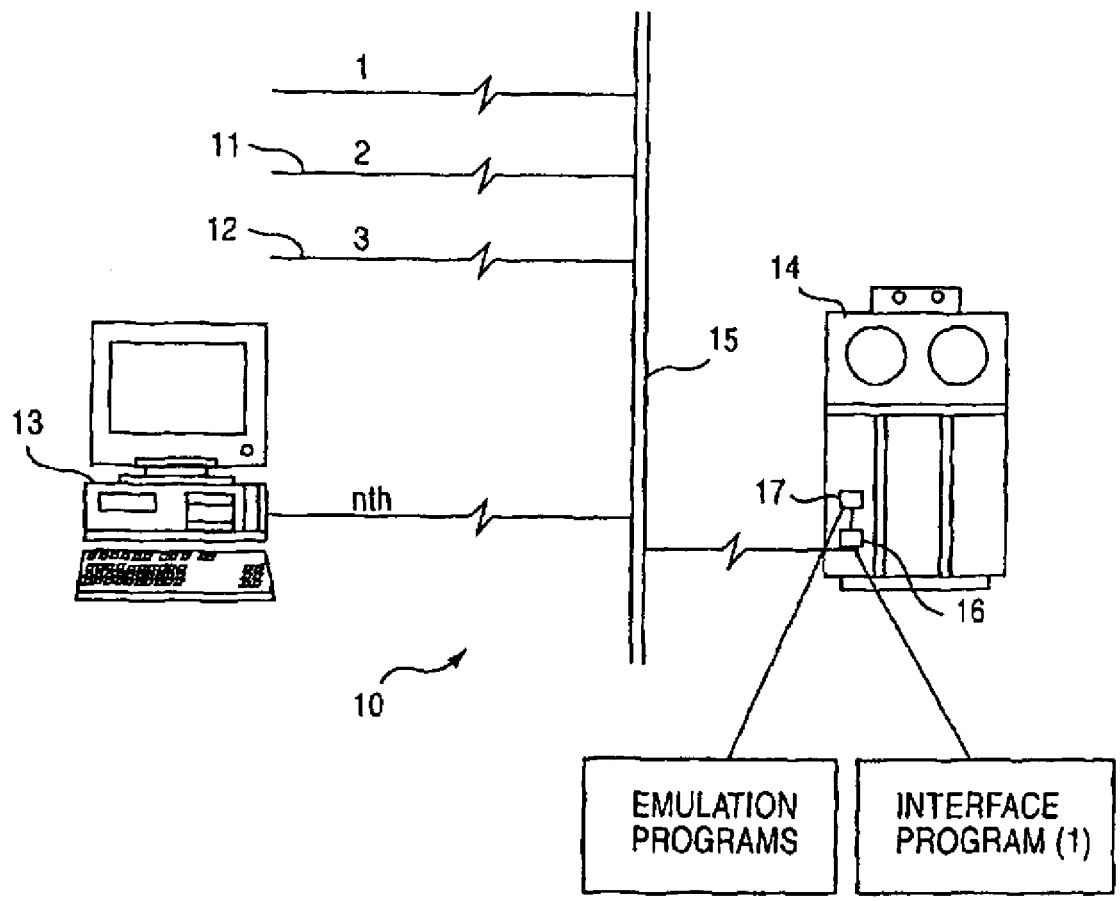
Figure 2:
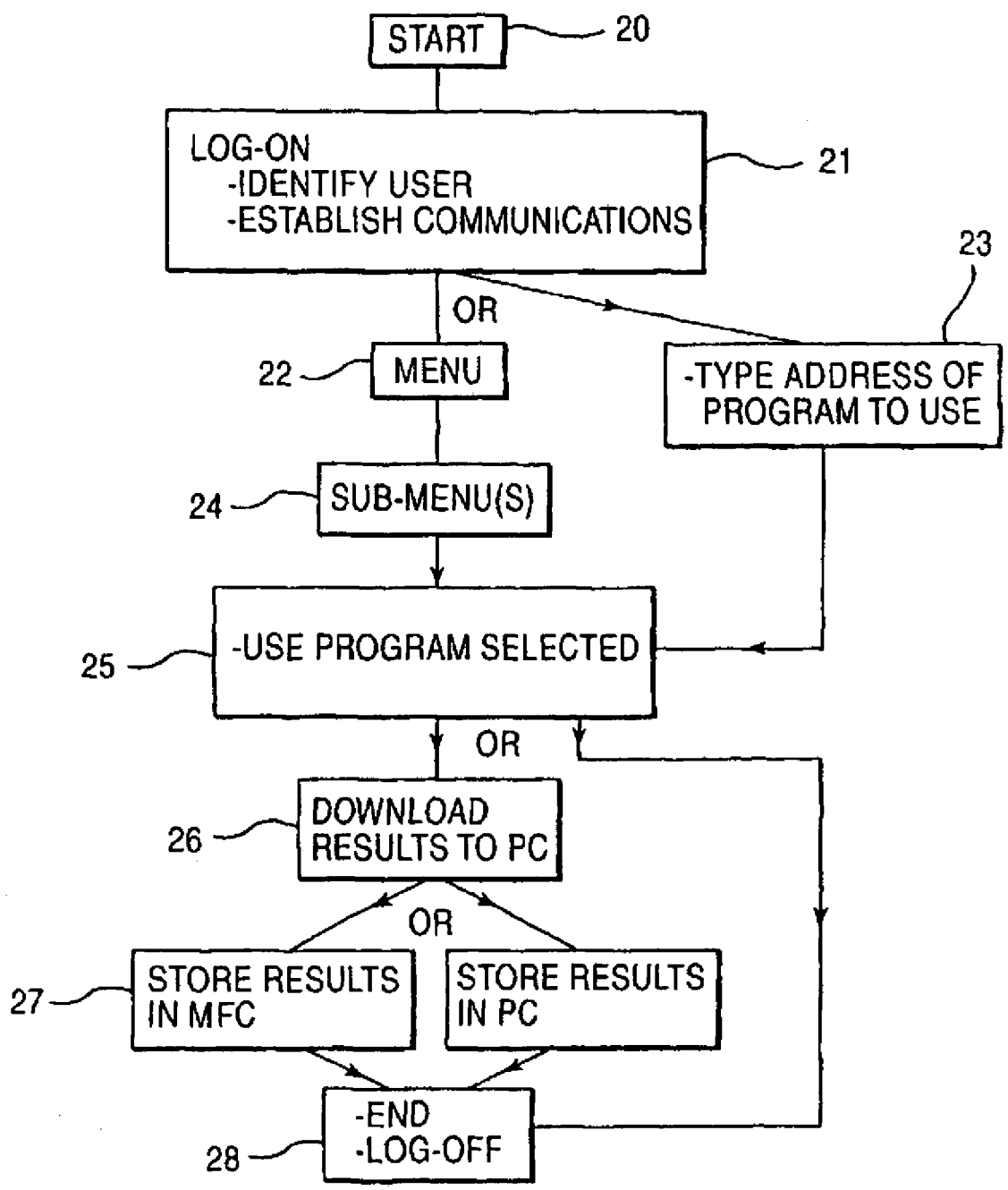

FIG. 2 is a flow chart depicting the operation of the system. After start-up 20 of both the main frame or host and/or server and any PCs, a PC and the main frame or host and/or server are connected by a modem (not shown) and/or by present communication methods linking computers and/or networks. Main frame or host and/or server log-on 21 includes all the elements of information or data required by the system, such as, the location, name and address of the user, billing instructions, etc. The system then offers a menu 22 of software programs available to the PC or may permit the PC user to request or select one 23. The menu of available programs may be offered in categories with submenus of specific programs 24. This portion of the system is handled by the PC interface 16.

Once the specific program 25 is selected, the PC is interrogated for the information or input or instructions, that the main frame or host and/or server requires to operate the program. These interrogations and answers may go through the emulation port/program 17, if the programming of the PC and the main frame or host and/or server is or are dissimilar (and/or according to present communication methods linking computers and/or networks). The subsequent screen displays to the PC would depend on the selected program and the amount of input or instructions necessary to complete the task or result. When the selected program or task or result is completed by the main frame, or host and/or server, the PC user may select to download the results or data to the PC 26, or save, store, or archive in the main frame or host and or/server 27, or request or select another program to operate and repeat this process, or log off 28. Saving, storing, or archiving of programs and/or results or data in the mainframe or host and/or server, allows repeat users to store and collect information or data in the main frame or host and/or server using mainframe or host and/or server hardware capacity rather than using PC hardware capacity. Therefore, the capabilities and attributes (and performance) of the PC (or PCs) are increased by using mainframe or host and/or server capabilities and attributes and resources.

In the context of this invention, the main frame or host and/or server computer, in addition to being interchangeable, has or have the traditional capability of doing a multitude of tasks or calculations simultaneously for multiple users in a network. The main frame or host and/or server does not have to embody a monolithic mechanism/architecture but may be composed of several separate computers (but linked together when necessarily) which can be networked with a log-on or logged-on PC or PC's in a random sequence based on the next available main frame host and/or server time slot. In such a setup or architecture, the PC interface would control the log-on and direct the PC to the free main frame or host and/or server. In some instances, the PC interface can have the main frame or host and/or server capability necessary to accomplish or complete the requested or selected program(s), task(s), or result(s). Both the main frame/host/server and the PC, when linked or networked together, would contribute to increase capability, attribute, performance (including computing power) to the end product for the multiple (PC) users in the network.

The foregoing description of the invention has been presented for the purposes of illustration and description. The network has been described with regards to a few possible applications of the invention to illustrate the operation thereof. This description is not intended to limit the invention to the precise forms disclosed, however. Consequently, many modifications and variations are possible in light of the above teachings as expressed in the specification and appended claims.

I claim:

1. A computer network comprising:
a plurality of personal computers, each having at least one personal computer language; and
a host computer capable of running many applications simultaneously connected to at least one of said plurality of personal computer, said host computer including; personal computer interface means for interrogating at least one of said personal computers via a network to determine a name and address, operating system, and capability of at least one of said personal computers, said personal computer interface means storing the results of said interrogation, and emulation means for synchronizing a machine language of said host computer with at least one of said personal computer languages of at least one of said personal computers, wherein at least one of said personal computers provides inputs to said personal computer interface means in one of the personal computer languages to select a particular task, said host computer executes said task using said machine language, and communicates the results of said task to said emulation means, and said emulation means translates said host results from said machine language into at least one of said personal computer languages and relays said results to at least one of said personal computers through said personal computer interface means, wherein said personal computer interface means presents a menu of computer programs available in to said interrogation of at least one of said personal computers, and wherein said computer interface means queries at least one of said personal to determine if said results are to be downloaded or stored in said host computer, said personal computer interface means returning said results to an assigned storage address.

2. A system for providing the capabilities of a mainframe computer to a plurality of personal computers comprising:
a mainframe computer having emulation means for converting different personal computer languages into a machine language of said mainframe computer, a data link means for connection between said mainframe computer and said plurality of personal computers, said data link means including a personal computer interface, said personal computer interface interrogating and a name and address of a personal computer user, ROM a~ operating system, and capability, wherein any one of said plurality of personal computers may be connected to said mainframe computer and provide input through said personal computer interface, said mainframe computer performs the operations required of said input, and said results are returned to said personal computers through said personal computer interface, wherein said computer interface means presents a menu of computer, programs available in response to said interrogation of at least one of said personal computers, and wherein said personal computer interface means gueries at least one of said personal computers to determine if said results are to be downloaded or stored in said host computer, said personal computer interface means returning said results to an assigned storage address.

3. The system of claim 2, wherein said emulation means converts said personal computer input language into a machine language of said host computer and returns said results in said personal computer input language.

4. A method for enhancing the capabilities of a plurality of personal computers through networking with a mainframe computer comprising the steps of providing a mainframe computer having emulation means for converting different computer languages into a machine language of said mainframe computer, providing a network connecting at least one personal computer with said mainframe computer; at least one of said personal computers logging on to said network; requesting a particular program or application be accomplished by said mainframe computer from at least one of said personal computers;

providing required input data to said mainframe computer from at least of said personal computers through said network;

manipulating said data by said mainframe computer and producing a result; and retrieving said result from said mainframe computer to at least one of said personal computers through said network thereby enhancing the capability of said personal computers with the attributes of said mainframe computer;

wherein said personal computer interface means presents a menu of computer programs available in response to said interrogation of at least one of said personal computers, and wherein said personal computer interface means gueries at least one of said personal computers to determine if said results are to be downloaded or stored in said host computer, said personal computer interface means returning said results to an assigned storage address.

5. The method of claim 4, further including the steps of: providing said mainframe computer with a personal computer interface, said mainframe computer having emulation means for converting different PC languages into a machine language, connecting said interface with said network, said interface creating a name address for each personal computer logged on into the network, and providing said interface with the operating parameters of each of the personal computers logged on, said interface allocating the capabilities of the mainframe computer required by the personal computers that are logged on to accomplish the requested program or application.

6. The method of claim 5, further providing said mainframe computer with an emulation capability, said emulation capability translating incoming personal computer data and requests into mainframe readable data and translating outgoing data from the mainframe computer into personal computer readable data.

* * * * *

UNITED STATES PATENT AND TRADEMARK OFFICE
CERTIFICATE OF CORRECTION

| | |
|---|---|
| PATENT NO. | : 7,584,270 B2 |
| APPLICATION NO. | : 10/319596 |
| DATED | : September 1, 2009 |
| INVENTOR(S) | : Hahn |

It is certified that error appears in the above-identified patent and that said Letters Patent is hereby corrected as shown below:

Please delete patent 7,584,270 in its entirety and insert patent 7,584,270 in its entirety as shown on the attached pages.

Signed and Sealed this
Twenty-first Day of February, 2012

David J. Kappos
*Director of the United States Patent and Trademark Office*

(12) United States Patent
Hahn

(10) Patent No.: US 7,584,270 B2
(45) Date of Patent: Sep. 1, 2009

(54) LOG ON PERSONAL COMPUTER

(76) Inventor: Victor Hahn, 3464 Colonial Ave., Roanoke, VA (US) 24018

( * ) Notice: Subject to any disclaimer, the term of this patent is extended or adjusted under 35 U.S.C. 154(b) by 301 days.

(21) Appl. No.: 10/319,596

(22) Filed: Dec. 16, 2002

(65) Prior Publication Data

US 2003/0140171 A1    Jul. 24, 2003

Related U.S. Application Data

(63) Continuation of application No. 08/954,213, filed on Oct. 20, 1997, now abandoned.

(51) Int. Cl.
*G06F 15/177* (2006.01)
(52) U.S. Cl. .................... 709/220; 709/224
(58) Field of Classification Search ............ 709/203, 709/253, 224, 236, 229; 718/1; 717/141; 358/400
See application file for complete search history.

(56) References Cited

U.S. PATENT DOCUMENTS

| | | | |
|---|---|---|---|
| 3,891,974 A * | 6/1975 | Coulter et al. | 703/23 |
| 3,909,800 A * | 9/1975 | Recks et al. | 710/5 |
| 4,377,852 A * | 3/1983 | Thompson | 710/47 |
| 4,486,827 A * | 12/1984 | Shima et al. | 710/261 |
| 4,527,237 A * | 7/1985 | Frieder et al. | 709/253 |
| 4,611,277 A | 9/1986 | Kemppainen et al. | 364/200 |
| 4,779,188 A * | 10/1988 | Gum et al. | 718/1 |
| 4,958,347 A * | 9/1990 | White et al. | 714/43 |
| 4,993,027 A * | 2/1991 | McGraw et al. | 714/29 |
| 5,036,484 A | 7/1991 | McCoy et al. | 703/23 |
| 5,163,833 A | 11/1992 | Olsen et al. | 439/61 |
| 5,274,810 A | 12/1993 | Meldrum | 395/700 |
| 5,287,460 A * | 2/1994 | Olsen et al. | 710/63 |
| 5,299,313 A | 3/1994 | Petersen et al. | 709/200 |
| 5,321,828 A * | 6/1994 | Phillips et al. | 703/28 |
| 5,325,361 A | 6/1994 | Lederer et al. | 370/94.1 |
| 5,388,060 A | 2/1995 | Adams, Jr. et al. | 703/27 |
| 5,388,215 A * | 2/1995 | Baker et al. | 709/229 |
| 5,410,681 A * | 4/1995 | Jessen et al. | 703/27 |
| 5,440,699 A | 8/1995 | Farrand et al. | 395/155 |
| 5,442,791 A | 8/1995 | Wrabetz et al. | |
| 5,446,868 A | 8/1995 | Gardea, II et al. | 395/500 |
| 5,452,460 A | 9/1995 | Distelberg et al. | 395/700 |
| 5,455,948 A | 10/1995 | Poole et al. | 395/650 |
| 5,483,647 A | 1/1996 | Yu et al. | 395/500 |

(Continued)

OTHER PUBLICATIONS

A successful example of mainframe software development on a personal computing system Lezniak, T.W.; Aerospace and Electronics Conference, 1988. NAECON 1988., Proceedings of the IEEE 1988 National May 23-27, 1988 pp. 626-635 vol. 2.*

(Continued)

*Primary Examiner* — Thong H Vu

(57) ABSTRACT

A computer network having a mainframe, host, or server computer capable of being selectively connected to a multiplicity of personal computers (PCs) such that the unlimited capabilities of CPU speed, memory, software, hardware, attributes and resources of the mainframe are accessed (utilized) by the PCs, thus, increasing the PC limited capabilities. The mainframe has an interface program for interrogating the name, address, and operating system of the PCs. The PCs provide input to the interface to select a particular task executed by the mainframe using mainframe machine language; results are either stored in the mainframe, or relayed back in corresponding PCs machine language for distribution to the multiple users in the network. Both, the mainframe or host or server, when networked with the PCs, would contribute to increase capability, performance, and attribute to the end product for the multiple users in the network.

6 Claims, 2 Drawing Sheets

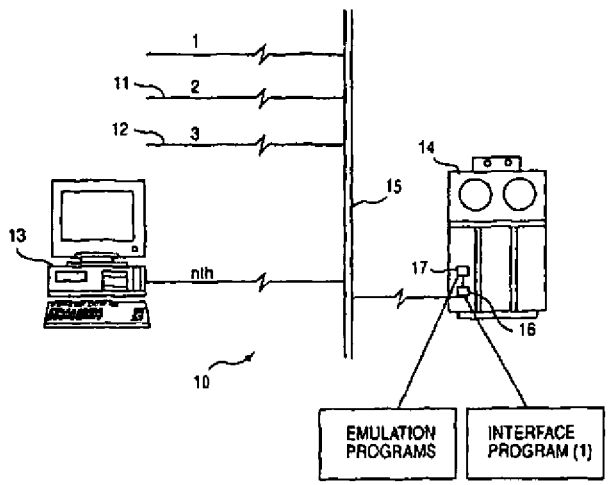

U.S. PATENT DOCUMENTS

| | | | |
|---|---|---|---|
| 5,490,134 A * | 2/1996 | Fernandes et al. | 370/466 |
| 5,608,865 A | 3/1997 | Midgely et al. | 395/180 |
| 5,630,102 A | 5/1997 | Johnson et al. | 703/28 |
| 5,664,098 A | 9/1997 | Bianchi et al. | 713/200 |
| 5,673,418 A | 9/1997 | Stonier et al. | 395/500 |
| 5,675,771 A | 10/1997 | Curley et al. | 395/500 |
| 5,678,032 A | 10/1997 | Woods et al. | 395/500 |
| 5,734,865 A | 3/1998 | Yu | 395/500 |
| 5,742,802 A * | 4/1998 | Harter et al. | 712/227 |
| 5,758,341 A | 5/1998 | Voss | 707/10 |
| 5,761,662 A | 6/1998 | Dasan | 707/10 |
| 5,767,851 A | 6/1998 | Yee et al. | 345/346 |
| 5,784,439 A | 7/1998 | Nagelmann et al. | 379/91.01 |
| 5,808,558 A * | 9/1998 | Meek et al. | 340/870.01 |
| 5,812,127 A | 9/1998 | Janay et al. | 346/333 |
| 5,812,864 A | 9/1998 | McCoy et al. | 395/800 |
| 5,822,563 A | 10/1998 | Sitbon et al. | 395/500 |
| 5,838,948 A * | 11/1998 | Bunza | 703/27 |
| 5,841,670 A | 11/1998 | Swoboda | 364/578 |
| 5,896,522 A | 4/1999 | Ward et al. | 395/500 |
| 5,903,719 A | 5/1999 | Yamamoto | 395/183.14 |
| 5,909,569 A | 6/1999 | Housel et al. | 395/500 |
| 5,920,846 A * | 7/1999 | Storch et al. | 705/7 |
| 5,923,850 A * | 7/1999 | Barroux | 709/224 |
| 5,926,636 A | 7/1999 | Lam et al. | 709/171 |
| 5,931,913 A | 8/1999 | Meriwether et al. | 709/227 |
| 5,961,586 A | 10/1999 | Pedersen | 709/201 |
| 5,966,515 A * | 10/1999 | Alferness | 703/21 |
| 5,974,452 A | 10/1999 | Karapetkov et al. | 709/218 |
| 5,983,369 A | 11/1999 | Bakoglu et al. | 714/46 |
| 6,002,864 A * | 12/1999 | Heyman | 703/23 |
| 6,006,022 A * | 12/1999 | Rhim et al. | 716/1 |
| 6,006,278 A | 12/1999 | Cottrill | 709/300 |
| 6,009,256 A * | 12/1999 | Tseng et al. | 703/13 |
| 6,026,238 A * | 2/2000 | Bond et al. | 717/141 |
| 6,031,988 A * | 2/2000 | Nakashima | 703/26 |
| 6,044,408 A * | 3/2000 | Engstrom et al. | 719/328 |
| 6,108,420 A | 8/2000 | Larose et al. | 380/4 |
| 6,147,773 A * | 11/2000 | Taylor et al. | 358/400 |
| 6,212,191 B1 | 4/2001 | Alexander et al. | 370/401 |
| 6,377,998 B2 * | 4/2002 | Noll et al. | 709/236 |
| 6,385,567 B1 * | 5/2002 | Lew et al. | 703/27 |
| 6,622,116 B2 * | 9/2003 | Skinner et al. | 702/183 |

OTHER PUBLICATIONS

Client-server computing architecture: an efficient paradigm for project management; Hura, G.S.; Engineering Management Conference, 1995. 'Global Engineering Management: Emerging Trends in the Asia Pacific'., Proceedings of 1995 IEEE Annual International Jun. 25-28, 1995 pp. 146-152.*

Managing PC networks; Heilbronner, S.; Wies, R.; Communications Magazine, IEEE vol. 35, Issue 10, Oct. 1997 pp. 112-117.*

Distributed Processing Involving Personal Computers and Mainframe Hosts; Parr, F.; Auerbach, J.; Goldstein, B.; Selected Areas in Communications, IEEE Journal on vol. 3, Issue 3, May 1985 pp. 479-489.*

Office Action from the European Patent Office dated Dec. 18, 2007 for corresponding Application 99 914 914.9—1243.

Notification of Reasons for Refusal for Office Action dated Jan. 15, 2008 from the Japanese Patent Office for Patent Application No. 2000-605908.

* cited by examiner

LOG ON PERSONAL COMPUTER

This application is a Continuation of prior application Ser. No. 08/954,213 filed Oct. 20, 1997 now abandoned.

FIELD OF THE INVENTION

This invention relates in general, to the communication between computers, more specifically, to the capabilities and operation of personal computers (PC)(PCs) and its expansion when PCs are networked with a mainframe, host, and/or server computer; still more specifically, when a PC (or PCs) access the mainframe, host and/or server computer's greater and more flexible capabilities or unlimited capabilities of CPU speed, computing power, RAM, ROM memory, memory, hardware, software, and attributes, therefore, increasing the limited or fixed capabilities of the PC (or PCs). In particular, the case or instances where the PC (or PCs) is used merely as a "terminal" for the mainframe, host, and/or server computer. Still more particular, the case to establish communication between computers in general, (as described and disclosed in the present invention), "irregardless" of their relative capabilities (and/or sizes); this case to include PC to PC (direct) communication.

Problem

Ownership and operation of PCs has enjoyed a phenomenal growth during the recent years. The capabilities of each generation of new PCs has increased based on better and faster central processing units (CPUs), such as the Intel 320, 386, 486, and then the Pentium series, as well as to an increase in memory capacity (i.e., hard drives, RAM, ROM, etc). Apple computers have also progressed from the IIib through the McIntosh. There are also numerous companies producing clones under their own labels. With the explosion of the number of PCs in use, an even greater explosion or progress or evolution of uses, otherwise known as software, software programs, and/or applications, is taking place, as well an advance in network architectures and in the Internet itself. As the capabilities and speed of the CPUs increase, the amount of computing power, or speed, available or required to run the new and/or larger software increases, as well as the amount or capacity of ROM and RAM memory, and memory. This progression or evolution has allowed the programmers to develop more sophisticated, expensive, and larger software (AUTO CAD was around US $4,000.00 in 1997) that requires more memory and faster CPU speeds to operate, that can accomplish more difficult and complex tasks. The availability and applications of software have greatly increased over the recent years.

However, the ever increasing requirements of the new software quickly outpaces the capability of the old PC hardware. In order to run the new software, the PC owner must upgrade the old PC or invest in a more capable PC. It has been stated that the consumer usually upgrades every 3 to 5 years.

Most PCs are purchased by the consumer as an integral whole or name brand complete computer with fixed motherboard, CPU, RAM, and ROM memory elements or components, and some basic software already programmed into the computer, i.e., with fixed or limited capabilities. The normal consumer probably does not know, understand, or care, what is inside the computer case. The more "computer literate" consumers may upgrade the capabilities of their computer by adding after-market components, such as faster CPUs and increased memory until the motherboard may reach its designed limits and/or capabilities. However, software that requires more capability than the PC hardware can deliver cannot be successfully operated on the PC computer. Therefore, in the normal course of events, due to the fixed/limited capabilities, the consumer needs or is required to discard the old, less capable computer about every 3 to 5 years, and purchases the newer model with more but still limited capabilities, so that the more sophisticated, expensive, and larger software and/or applications that require more capabilities, can be run. Certainly, this expensive solution economically drives the computer industry.

Art Background

It is known that the standard memory of a hard drive of a PC in 1997 was about 1.5 giga bytes, about 3 times more than 2 years earlier, and that the standard CPU clock speed, was about 133 MHz (Intel 486), about 3 times faster than 2 years earlier (slow). Clock speed is just equally spaced signals to cause an operation(s)). The motherboard, the main board where all components and connections are attached or inserted, is about 9 by 11 inches (2009), slightly larger than in 1997, and still comes with one square slot for the CPU, and with 4 empty slots for 4 RAM memory (or main memory) "chips", each chip about 32 Mbytes (1997), to be filled according user's needs and cost. (NOTE that not enough RAM will easily compromise CPU and PC capabilities and performance). Buses (cables/connectors) that transfer data and signals for I/O between components, mainly into the CPU, can also easily compromise CPU and PC capabilities, if the bus speed is too slow. It is said that Intel has spent 20-plus years focusing on clock speed, while the I/O architecture of the PC has made relatively minor advances; therefore, most PC's, including the CPU, are, (presently in the market), easily bottlenecked by I/O limitations of data transfer, further diminishing the capabilities and performance of the CPU and the PC. In conclusion, the PC has very "fixed or limited" capabilities due to (1) its still very small, simple and limited hardware (motherboard, CPU, RAM, hard drive, buses, etc,) and software architectures, and (2) NOT balanced hardware and software architectures for fast I/O capabilities and performance.

Regarding mainframes, it is known nowadays (2009), that the smallest IBM mainframe/server, the System z9 series, runs at about 26 MIPS, and that their largest mainframe/server, the System z10 series, runs at about 31,000 MIPS; that is about 1,200 times faster computing power/capabilities within the mainframe and servers range; and with their latest Parallel Sysplex technology, joining up to 32 z10's, as fast as 981,000 MIPS; (i.e., about 38,000 more computing power that the 26 MIPS of the z9; Ref: Wikipedia). (MIPS is a much better indicator of the computing power and speed of a computer). They have very complex CPU architectures (like multi-CPU's, CPU's with quad-core technology, etc,), hardware architectures (fast I/O devices/methods for fast data traffic, unlimited memory, etc,), and software architectures (data formatted in a special way for fast data traffic, powerful software, etc,). And by balancing I/O devices/capabilities with MIPS, with multi-CPU's, with main storage, and by adding the 3 sophisticated architectures, then, their computing power, capabilities, attributes, and performance, may increase exponentially. This demonstrates the wide range of fast CPU speeds, computing power, flexibility, capabilities, and attributes, available to mainframes, to large or larger computers, and/or to servers, in general. Some mainframes and/or servers, (if not all), are capable to handle over 250,000 queries simultaneously. The acquisition price of the z9 starts at about $100,000 (in 2006), to millions for the model 2094-

S54 and z10. An average PC costs about $500 to $700 (2009). Cost is certainly associated with capabilities and performance of a given computer. There is also the minicomputer that fills the gap between the PC and the mainframe, with their own range of faster CPU speeds, capabilities, and attributes. The minicomputer, the mainframe, and the servers fill the wide spectrum of computers sizes between the PC and the supercomputers, all of them most likely connected to the internet network. In conclusion, the capabilities and attributes of a PC are very or "extremely" limited as compared to (or as "if" when networked to) a larger one, more specifically, with a mainframe, host, and/or server computer.

SUMMARY OF THE INVENTION

In view of the foregoing, it is therefore an object of this invention to replace or expand or connect the fixed or limited capabilities and attributes of a PC with greater and more flexible capabilities and attributes.

It is an object of this invention to reduce the requirement or need to upgrade a PC or to purchase a new PC in order to get or by getting the benefits of a single program or programs, of a sophisticated or expensive program(s), or of a wide or unlimited number of programs, as well as the benefits of fast or unlimited CPU speed, of memory, and of capabilities or unlimited capabilities, and attributes, available to larger or more capable computers.

It is an object of this invention to provide hardware and method whereby a PC operator with a need for a program or programs, or a complex program(s) or larger program or programs, beyond the fixed or limited capabilities of the PC or the already loaded or quite loaded software capacity, may temporarily access (log on) a more capable host or mainframe computer and/or server, and work or operate the program or programs on the more capable mainframe, host and/or server computer using the PC and a modem and/or present conventional communication lines and methods between or connecting computers and/or networks, freeing memory space, software, CPU speed, and hardware capabilities.

It is an object of this invention to expand or connect the limited or fixed capabilities of the PC by accessing (log-on) a host or main frame computer and/or server, in order to obtain the greater or unlimited capabilities of CPU processing speed, storage or memory, software programs, and mainframe, host, and/or server attributes.

It is another object of this invention to establish a temporary network, in the nature of a client/server format or architecture, in which an older or less capable PC may be or is operatively connected to a more capable host or main frame computer and/or server, and to their attributes.

It is yet another object of this invention to program the host or main frame and/or server with a wide or unlimited selection of software packages and operating systems compatible (as much as possible, and/or according to present methods) with conventional PCs. The host or main frame and/or server may include an emulation-like processing capability as presently found on conventional communication methods linking computers and/or networks for translating PC language into host or main frame and/or server language and vice versa whereby the input and the output would be in PC language but the manipulation of the data would be in the host or main frame language.

It is still another object of this invention to provide the host or main frame and/or server with a PC interface as presently found on communication methods linking computers and/or networks, which interrogates and stores information or data concerning the location and possibly the capabilities of the PC. The PC interface operates and may or may not determine the specifics of each individual PC logging on regarding possibly the CPU speed, RAM, ROM, and operating system but not necessarily. The interface determines the host or main frame and/or server I/O necessary to communicate with the PC. The interface accepts the requested program, possibly determines the amount of memory necessary to complete the task/result including the amount of host or main frame and/or server memory required until the results or data are downloaded to the PC, or saved, stored, or archived in the PC interface or in the mainframe or host and/or server, the host or main frame and/or server computing time, the total transaction time, and the fee, if any. Fees for accessing the mainframe or host and/or server can be done by (1) according to the particular type of program or programs selected and/or used, (2) by the time logged-on, (3) by CPU time used, (4) by monthly use, (5) and by present conventional methods.

While the capabilities of the PC and the host or mainframe and/or server computer as described above are in terms of the less capable PC and the more capable host or main frame and/or server, it is also an object and/or another embodiment of this invention to establish communication between the PC and mainframe or host and/or server irregardless of their relative capabilities as described and disclosed in the present invention. In addition, the invention is not limited to hardware deficiencies or to their relative capabilities, but to lack of programming, and in another embodiment of the invention, to lack or need to establish communication between computers in general, "irregardles" of their relative capabilities and/or sizes as well, as described and disclosed in this invention, this case to include PC to PC (direct) communication.

BRIEF DESCRIPTION OF THE DRAWINGS

FIG. 1 is an illustration of the overall system;

FIG. 2 is a flow chart illustrating operation of the system

DESCRIPTION OF THE PREFERRED EMBODIMENT

In FIG. 1, the operating system 10 is shown with several PCs 11, 12, 13 logged on to the host or main frame and/or server computer 14. The particular data link between the PCs and the main frame or host and/or server may be by way of a modem (not shown) and/or by present communication methods linking computers and/or networks in a wide area network (WAN), where the main frame or host and/or server may serve PCs in a wide area. This construction or network architecture would allow PC owners or operators to log on to the system using commercial lines and/or present communication methods linking computers and/or networks. Of course, the system could be hard wired according to present method linking computers and/or networks. In FIG. 1 the connection of the main frame or host and/or server computer 14 to the PCs is illustrated by a large wide area network (WAN) 15.

The modem (not shown) and/or present communication methods linking computers and/or networks, connects the PC with the PC interface 16. The PC interface 16 is programmed to interrogate the PC electronically or by menu to possibly determine the capability of the PC. Based on the interrogation, but not necessarily, the PC interface 16 offers a wide/ample selection of programs and applications, (by menu), that are compatible, as much as possible, between the particular PC and the host or mainframe and/or server. For example, the extremes of the available programs for selection could range from those instances in which the PC requires or requests only the use of software with possibly no additional hardware capability, through those instances where the PC is used merely as a terminal for the host or main frame and/or server, this would allow the PC owner or operator (or PCs) to freely operate the mainframe or host and/or server, (as "if" the mainframe or host and/or server was its own personal computer at his location), therefore, enhancing the capabilities and attributes of the PC (or PCs) in the network; this to include performance, efficiency, and computing power.

In instances which may or may not require the computing power of a much greater magnitude than the PC, and as well as in normal operation and/or according to present communication methods linking computers and/or networks, the PC interface 16 directs the PC I/O to the host or main frame and/or server emulation port/program 17. The emulation program, in effect, makes the PC perform as a terminal to the host or main frame and/or server. The emulation program allows the PC user to access the main frame or host and/or server using the PC language and receive the results in the PC language. The emulation program translates the PC instructions or input into main frame language and translates the main frame results into PC language for distribution to the multiple users in the network, therefore, enhancing the capabilities, performance, and attributes of the PC.

FIG. 2 is a flow chart depicting the operation of the system. After start-up 20 of both the main frame or host and/or server and any PCs, a PC and the main frame or host and/or server are connected by a modem (not shown) and/or by present communication methods linking computers and/or networks. Main frame or host and/or server log-on 21 includes all the elements of information or data required by the system, such as, the location, name and address of the user, billing instructions, etc. The system then offers a menu 22 of software programs available to the PC or may permit the PC user to request or select one 23. The menu of available programs may be offered in categories with submenus of specific programs 24. This portion of the system is handled by the PC interface 16.

Once the specific program 25 is selected, the PC is interrogated for the information or input or instructions, that the main frame or host and/or server requires to operate the program. These interrogations and answers may go through the emulation port/program 17, if the programming of the PC and the main frame or host and/or server is or are dissimilar (and/or according to present communication methods linking computers and/or networks). The subsequent screen displays to the PC would depend on the selected program and the amount of input or instructions necessary to complete the task or result. When the selected program or task or result is completed by the main frame, or host and/or server, the PC user may select to download the results or data to the PC 26, or save, store, or archive in the main frame or host and or/server 27, or request or select another program to operate and repeat this process, or log off 28. Saving, storing, or archiving of programs and/or results or data in the mainframe or host and/or server, allows repeat users to store and collect information or data in the main frame or host and/or server using mainframe or host and/or server hardware capacity rather than using PC hardware capacity. Therefore, the capabilities and attributes (and performance) of the PC (or PCs) are increased by using mainframe or host and/or server capabilities and attributes and resources.

In the context of this invention, the main frame or host and/or server computer, in addition to being interchangeable, has or have the traditional capability of doing a multitude of tasks or calculations simultaneously for multiple users in a network. The main frame or host and/or server does not have to embody a monolithic mechanism/architecture but may be composed of several separate computers (but linked together when necessarily) which can be networked with a log-on or logged-on PC or PC's in a random sequence based on the next available main frame host and/or server time slot. In such a setup or architecture, the PC interface would control the log-on and direct the PC to the free main frame or host and/or server. In some instances, the PC interface can have the main frame or host and/or server capability necessary to accomplish or complete the requested or selected program(s), task (s), or result(s). Both the main frame/host/server and the PC, when linked or networked together, would contribute to increase capability, attribute, performance (including computing power) to the end product for the multiple (PC) users in the network.

The foregoing description of the invention has been presented for the purposes of illustration and description. The network has been described with regards to a few possible applications of the invention to illustrate the operation thereof. This description is not intended to limit the invention to the precise forms disclosed, however. Consequently, many modifications and variations are possible in light of the above teachings as expressed in the specification and appended claims.

I claim:

1. A computer network comprising:
a plurality of personal computers, each having at least one personal computer language; and
a host computer capable of running many applications simultaneously connected to at least one of said plurality of personal computer, said host computer including;
personal computer interface means for interrogating at least one of said personal computers via a network to determine a name and address, operating system and capability of at least one of said personal computers, said personal computer interface means storing the results of said interrogation, and
emulation means for synchronizing a machine language of said host computer with at least one of said personal computer languages of at least one of said personal computers,
wherein at least one of said personal computers provides inputs to said personal computer interface means in one of the personal computer languages to select a particular task, said host computer executes said task using said machine language, and communicates the results of said task to said emulation means, and said emulation means translates said host results from said machine language into at least one of said personal computer languages and relays said results to at least one of said personal computers through said personal computer interface means,
wherein said personal computer interface means presents a menu of computer programs available in response to said interrogation of at least one of said personal computers, and
wherein said personal computer interface means queries at least one of said personal computers to determine if said results are to be downloaded or stored in said host computer, said personal computer interface means returning said results to an assigned storage address.

2. A system for providing the capabilities of a mainframe computer to a plurality of personal computers comprising:
a mainframe computer having emulation means for converting different personal computer languages into a machine language of said mainframe computer,
a data link means for connection between said mainframe computer and said plurality of personal computers, said data link means including a personal computer interface, said personal computer interface interrogating and storing information concerning a name and address of a personal computer user, operating system, and capability, wherein any one of said plurality of personal computers may be connected to said mainframe computer and provide input through said personal computer interface, said mainframe computer performs the operations required of said input, and said results are returned to said personal computers through said personal computer interface, wherein said personal computer interface means presents a menu of computer programs available in response to said interrogation of at least one of said personal computers, and wherein said personal computer interface means queries at least one of said personal computers to determine if said results are to be downloaded or stored in said host computer, said personal computer interface means returning said results to an assigned storage address.

3. The system of claim 2, wherein said emulation means converts said personal computer input language into a machine language of said host computer and returns said results in said personal computer input language.

4. A method for enhancing the capabilities of a plurality of personal computers through networking with a mainframe computer comprising the steps of:

providing a mainframe computer having emulation means for converting different computer languages into a machine language of said mainframe computer;

providing a network connecting at least one personal computer with said mainframe computer;

at least one of said personal computers logging on to said network;

requesting a particular program or application be accomplished by said mainframe computer from at least one of said personal computers;

providing required input data to said mainframe computer from at least one of said personal computers through said network;

manipulating said data by said mainframe computer and producing a result; and retrieving said result from said mainframe computer to at least one of said personal computers through said network thereby enhancing the capability of said personal computers with the attributes of said mainframe computer, wherein said personal computer interface means presents a menu of computer programs available in response to said interrogation of at least one of said personal computers, and wherein said personal computer interface means queries at least one of said personal computers to determine if said results are to be downloaded or stored in said host computer, said personal computer interface means returning said results to an assigned storage address.

5. The method of claim 4, further including the steps of:

providing said mainframe computer with a personal computer interface, said mainframe computer having emulation means for converting different PC languages into a machine language, connecting said interface with said network, said interface creating a name and address for each personal computer logged on into the network, and providing said interface with the operating system capability of each of the personal computers logged on, said interface allocating the capabilities of the mainframe computer required by the personal computers that are logged on to accomplish the requested program or application.

6. The method of claim 5, further providing said mainframe computer with an emulation capability, said emulation capability translating incoming personal computer data and requests into mainframe readable data and translating outgoing data from the mainframe computer into personal computer readable data.

* * * * *